Figure 1:
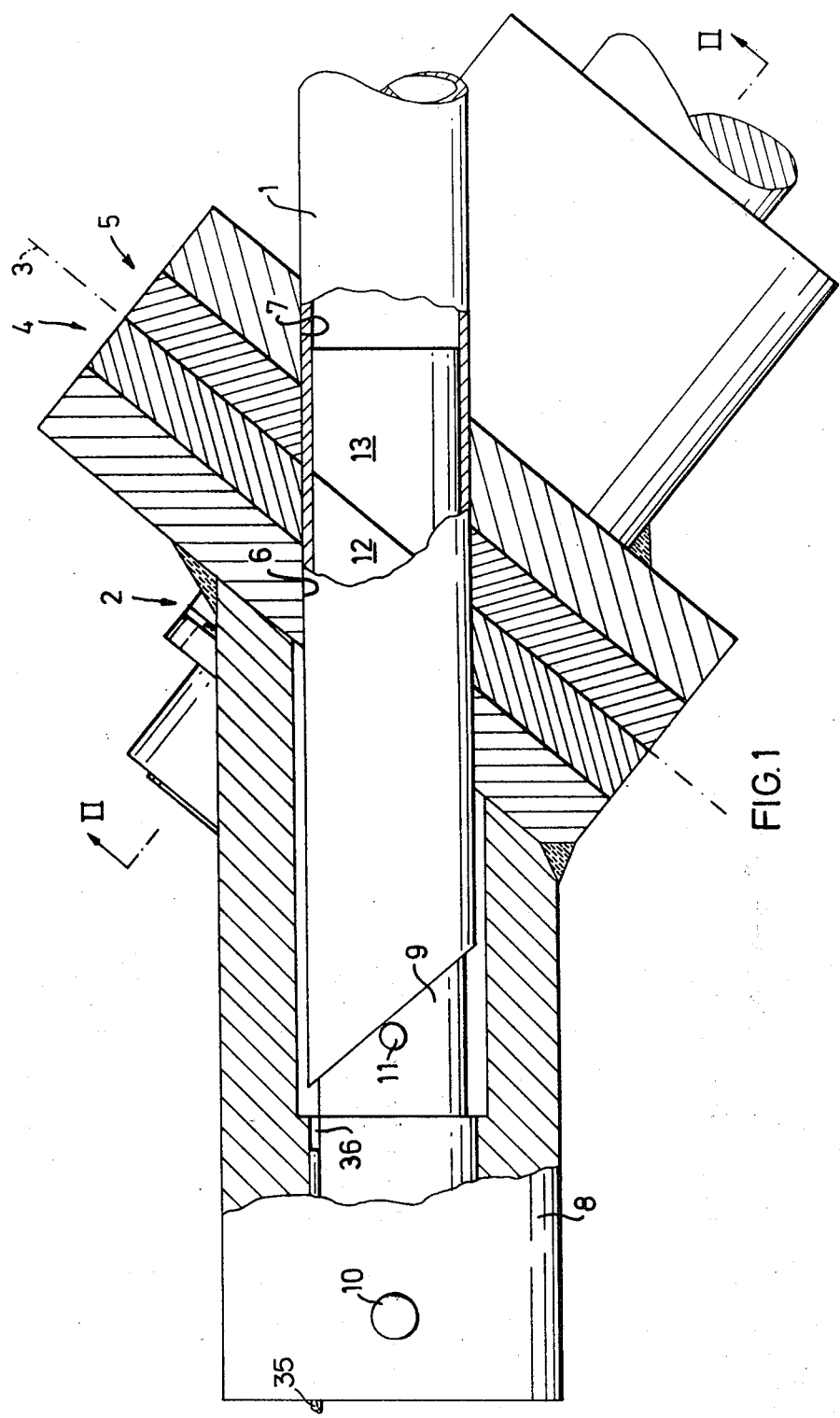

United States Patent [19]

Lagher

[11] 4,428,118
[45] Jan. 31, 1984

[54] PIPE PARTING APPARATUS

[75] Inventor: Gunnar H. Lagher, Fjälkinge, Sweden

[73] Assignee: A.O. Arkitektkontor AB, Stockholm, Sweden; a part interest

[21] Appl. No.: 368,292

[22] Filed: Apr. 13, 1982

[30] Foreign Application Priority Data

Apr. 22, 1981 [SE] Sweden ............................ 8102551

[51] Int. Cl.³ ............................................. B23D 21/02
[52] U.S. Cl. ............................................. 30/92; 83/186
[58] Field of Search .................. 30/92, 93, 94, 95, 96, 30/97; 83/185, 186, 187

[56] References Cited

U.S. PATENT DOCUMENTS 2,397,048   3/1946   Roop ..................................... 83/186
3,803,895   4/1974   King ..................................... 30/92 X

FOREIGN PATENT DOCUMENTS 1216746   12/1970   United Kingdom ............... 30/92
251344     5/1970    U.S.S.R. .............................. 30/92
854615     8/1981    U.S.S.R. .............................. 30/92

Primary Examiner—Jimmy C. Peters
Attorney, Agent, or Firm—Young & Thompson

[57] ABSTRACT

An apparatus for parting pipe has two shearing members bearing against each other and mutually movable along a cutting plane and with holes for the pipe which form exterior shearing edges. The pipe bore is supported by a mandrel divided into two sections mutually displaceable and forming interior shearing edges. The moving shearing member is driven by a crank mechanism, including a single crankshaft, at a mounting arrangement spaced from a bearing arrangement via which the fixed and the movable shearing members are mounted and guided and in which an elongate hole has its longitudinal axis directed towards the crankshaft and a bolt adapted to said hole.

4 Claims, 4 Drawing Figures

PIPE PARTING APPARATUS

The present invention relates to an apparatus for parting pipe, where a fixed and a moving shearing member bear against each other in a cutting plane for the pipe, each member having a hole for the pipe, adjusted to the external shape of the pipe, the edges of the holes forming a fixed and a moving exterior shearing edge, and where one shearing member has a mandrel adapted for supporting the bore of the pipe, said mandrel being divided into a first and a second section which, in association with the respective shearing member, are mutually movable along a plane of contact coincident with the cutting plane and which form a fixed and a movable interior shearing element, there being a crank mechanism included in a drive means for the moving shearing member.

An apparatus of this type is already known from the Swedish Pat. No. 176 612. According to this known embodiment, the moving shearing member is actuated by a pair of arms mounted on excentric shafts and forming an angle of about 90° with each other. Said excentric shafts are mutually synchronized such that only one excentric shaft is in motion at a time. The wall of the pipe is thus first cut through in two substantially diametrically opposed sections of the pipe circumference and thereafter in two sections substantially at right angles thereto. Due to the presence of the two excentric shafts, this drive mechanism will be comparatively voluminous and complicated, and thus naturally expensive also.

The object of the invention is to eliminate said drawbacks and to provide a substantially simplified apparatus for parting pipe by shearing.

This is achieved in accordance with the invention in that a single crankshaft is included in the rank mechanism and is in engagement with the moving shearing member at a mounting arrangement spaced from a bearing arrangement, with the aid of which the fixed and the moving shearing member are mutually mounted and guided, there being incorporated in the bearing arrangement an elongate hole having its longitudinal axis directed towards the crankshaft and a bolt adapted to said hole.

In a particularly advantageous embodiment the mounting arrangement and the bearing arrangement are situated on opposite sides of the hole intended for the pipe in the moving shearing member, the hole thus being given an elliptical path of movement.

In this way the moving shearing edges will move round the whole circumference of the pipe during a single rotation of the crankshaft.

Figure 2:
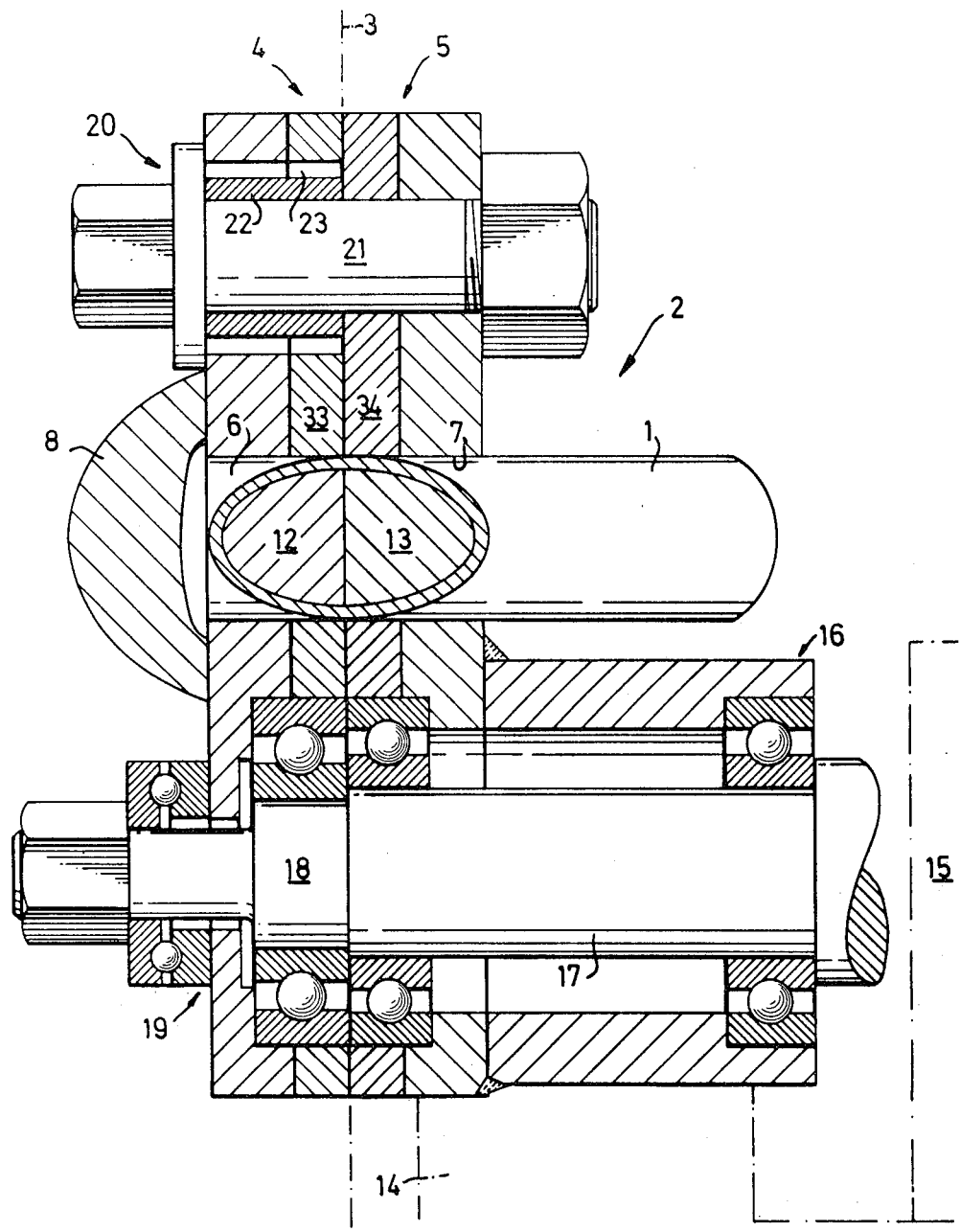
Figure 3:
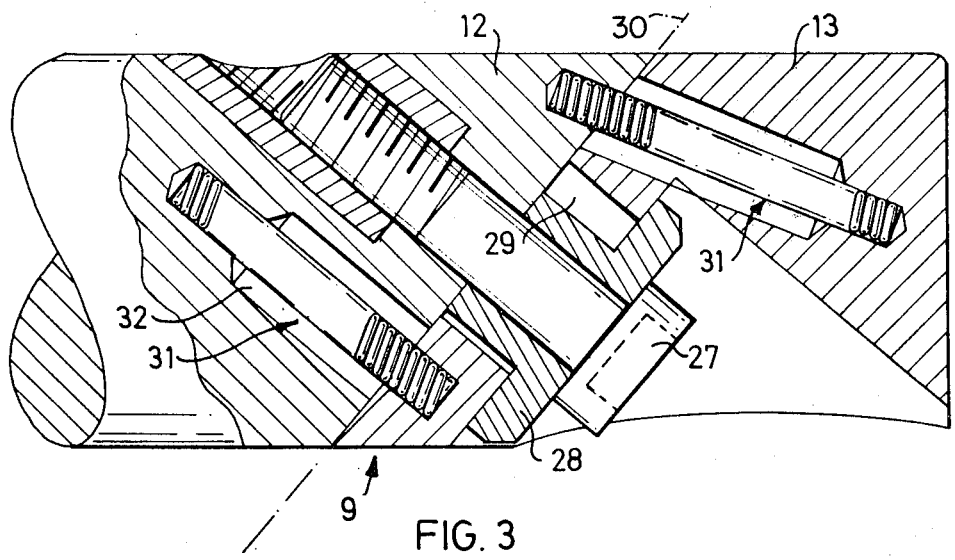
Figure 4:
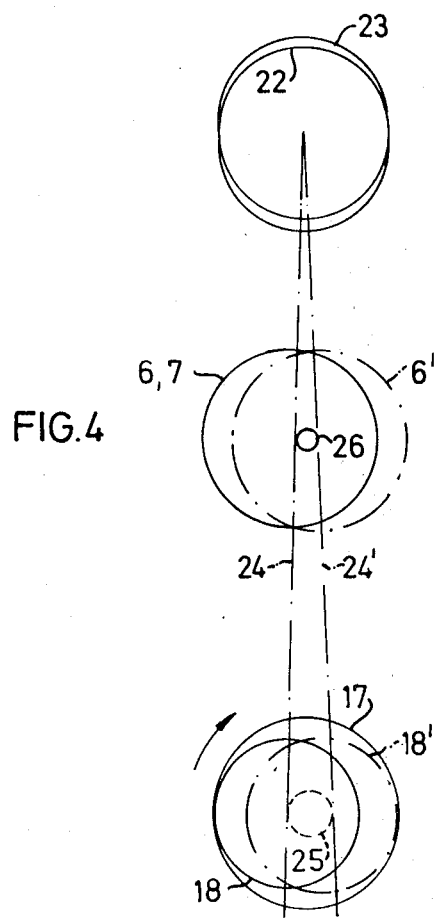

The invention will now be described in more detail in the following with the aid of an embodiment example illustrated on the appended drawing, where FIG. 1 is a view from above, partially in section, of an apparatus in accordance with the invention, FIG. 2 is a section along the line II—II in FIG. 1, FIG. 3 illustrates the mandrel and its two sections, and FIG. 4 is a schematic diagram of the motion between the shearing members.

As illustrated in FIG. 1, a pipe 1 intended for parting is inserted in an apparatus 2, made in accordance with the invention, for parting pipe. In this particular case the intention is to skew-cut the pipe 1 along a cutting plane 3, but square cutting is naturally also possible with another embodiment of the apparatus 2.

Two shearing members 4 and 5, included in the apparatus 2, bear against each other in the cutting plane 3, the shearing member 4 having a hole 6 and the shearing member 5 having a hole 7 for the pipe 1. The holes 6 and 7 are arranged so that they have a good fit against the exterior of the pipe 1, for supporting the pipe well on the outside.

A mandrel holder 8 is incorporated in the shearing member 4, a mandrel 9 being retained in the holder by means of a taper pin 10. The mandrel 9 is also provided with a stop 11 for the end of the pipe 1. The mandrel 9 is intended to form a support for the interior of the pipe 1, and it therefore projects a distance into the pipe 1. A first section 12 of the mandrel 9 is situated in the shearing member 4, while a second section 13 of the mandrel 9 is situated in the shearing member 5. The two mandrel sections 12 and 13 are mutually movable along a contact plane coincident with the cutting plane 3.

The shearing member 5 is fixed and is mounted on a support 14 which also carries a motor 15 for a crank mechanism 16 for driving the moving shearing member 4. In the crank mechanism 16 there is included a shaft 17 driven by the motor 15 and journalled in the fixed shearing member 5, said shaft being provided with a crank pin 18 coacting with a mounting arrangement 19 at the moving shearing member 4. The two shearing members 4 and 5 are kept bearing against each other by the construction of the mounting arrangement 19 and the shaft 17.

The uppermost portion of the moving shearing member 4 is guided relative the fixed shearing member 5 with the aid of a bearing arrangement 20 in which a bolt 21, passing through the fixed shearing member 5, carries a sleeve 22 for guiding in an elongate hole 23 in the moving shearing member 4. The longitudinal axis of the elongate hole 23 is directed towards the shaft 17. Thus, when the shaft 17 rotates, the moving shearing member 4 will move like a connecting rod in a piston motor. The result will be that the two holes 6 and 7 will obtain a given mutual motion during a revolution of the shaft 17.

There is schematically shown in FIG. 4 how the hole 6 moves relative the hole 7 when the shaft 17 rotates clockwise. In an initial position, illustrated by full lines, the holes 6 and 7 are in register, while the sleeve 22 is situated substantially at the middle of the elongate hole 23. In this situation the crank pin 18 has its centre on a line 24 which also goes through the centre of the holes 6 and 7 as well as the centre of the sleeve 22. When the shaft 17 has rotated half a turn, the crank pin 18 will assume the position 18', while the hole 6 is moved to the position 6'. The line 24 going through the centre of the sleeve 22, the hole 6 and the crank pin 18 will thus now be in the position 24'. From this it will be seen that while the shaft 17 rotates one revolution, the centre of the crank pin 18 moves in a circular path 25, while the centre of the hole 6 moves in an elliptical path 26. The relative positions of the sleeve 22, the hole 6 and the shaft 17 with its associated crank pin 18 may naturally be varied, all according to the need of obtaining the desired relative motion between the holes 6 and 7.

As will be seen from FIG. 3, the first section 12 and the second section 13 of the mandrel 9 are kept together with the aid of a bolt 27 passing through the second section 13 and screwed into the first section 12. A guide collar 28 mounted on the bolt 27 coacts with a hole 29 in the second section 13 for permitting the two sections 12 and 13 to be mutually displaced along a contact plane 30, which is intended to coincide with the cutting plane 3 in the apparatus 2 in an assembled condition of the mandrel 9.

The mandrel 9 is provided with a suitable member of centering means 31 for centering the sections 12 and 13 in the initial position illustrated in FIG. 3, in which the mandrel 9 is intended for insertion in an unparted pipe. In this case, each centering means 31 comprises a helical spring having one end fixed in the first section 12 and its other end in the second section 13. Each of the springs may be deflected in a bore 32 in either of the sections 12 or 13. The turns in the springs are suitably heavily pretensioned, so that the springs are given a large return bias. Centering between the sections 12 and 13 can also be provided with the aid of spring-biased balls, for example, or in some other suitable manner. The exterior edges of the two sections 12 and 13, situated at the contact plane 30, serve as inner shearing edges for parting the pipe.

On its face facing towards the shearing member 5, the shearing member 4 is provided with a shearing plate 33 through which the hole 6 passes. This shearing plate 33 bears against a corresponding shearing plate 34 of the shearing member 5. The shearing plates are suitably made from steel, the edges of the holes 6 and 7 facing towards each other on these shearing plates forming outer shearing edges for parting the pipe. The shearing plates 33 and 34 may suitably be replaceable. Since the shearing plates 33 and 34 are urged against each other and there is only very small play between them, there is achieved by coaction with the mandrel 9 that the pipe is simultaneously sheared off from both within and without when the shaft 17 rotates.

After terminated parting, the pin 18 stops in a position such that the holes 6 and 7 are situated in register, simultaneously as the mandrel sections 12 and 13 are also aligned. The parted pipe end can then be urged out of the apparatus 2 by means of a rod 35 running in a groove 36 in the mandrel holder 8. Before this, the uncut portion of the pipe 1 has been retracted for turning half a turn before the next parting. The skew-cut pieces of pipe obtained are particularly suitable for forming into pipe bends.

The mandrel 9 or the mandrel holder 8 may possibly be made easily removable for enabling the ejection of the parted pipe ends in the opposite direction instead. It is also possible to join the mandrel 9 to the shearing member 5, thus using a long mandrel inside the portion of the pipe 1 to the right in FIG. 1.

The pipe for parting naturally does not need to have a circular cross section, but other shapes of closed profiles are possible. The size of the mutual displacement between the holes 6 and 7 should suitably be at least just as great as the thickness of the pipe to be parted.

An apparatus of the type shown here can naturally be easily suited to different operation rates, and in particular, the handling of the pipe 1 and the parts resulting from it may be automated.

What I claim is:

1. An apparatus for parting pipe, where a fixed and a moving shearing member bear against each other in a cutting plane for the pipe, each member having a hole for the pipe, adjusted to the external shape of the pipe, the edges of the holes forming a fixed and a moving exterior shearing edge, and where one shearing member is provided with a mandrel adapted for supporting the bore of the pipe, said mandrel being divided into a first and a second section, which in association with the respective shearing member are mutually movable along a plane of contact coincident with the cutting plane, and which form a fixed and a movable interior shearing element, there being a crank mechanism included in a drive means for the moving shearing member, characterized in that a single crankshaft is included in the crank mechanism and is in engagement with the moving shearing member at a mounting arrangement spaced from a bearing arrangement, with the aid of which the fixed and the moving shearing members are mutually mounted and guided, there being incorporated in the bearing arrangement an elongate hole with its longitudinal axis directed towards the crankshaft and a bolt adapted to said hole.

2. An apparatus as claimed in claim 1, characterized in that the mounting arangement and the bearing arrangement are situated on opposite sides of the hole intended for the pipe in the moving shearing member, the hole thus being given an elliptical path of movement.

3. An apparatus as claimed in claim 2, characterized in that the crankshaft is journalled at the fixed shearing member and via a crank pin at one of its ends is in engagement with the moving shearing member at the mounting arrangement.

4. An apparatus as claimed in claim 2 or 3, characterized in that the hole intended for the pipe in the moving shearing member is substantially half-way between the mounting arrangement and the bearing arrangement.

* * * * *